May 1, 1956  L. E. ELFES  2,743,568
MOWER ATTACHMENT FOR TRACTORS
Filed Aug. 21, 1952  5 Sheets-Sheet 1

INVENTOR.
LEE E. ELFES
BY Carlson, Pitzner,
Hubbard + Wolfe
ATTORNEYS.

INVENTOR.
LEE E. ELFES
BY Carlson, Pitzner,
Hubbard & Wolfe
ATTORNEYS.

May 1, 1956 L. E. ELFES 2,743,568
MOWER ATTACHMENT FOR TRACTORS
Filed Aug. 21, 1952 5 Sheets-Sheet 5

INVENTOR.
LEE E. ELFES
BY Carlson, Pitzner,
Hubbard & Wolfe
ATTORNEYS.

United States Patent Office 2,743,568
Patented May 1, 1956

2,743,568

MOWER ATTACHMENT FOR TRACTORS

Lee E. Elfes, Birmingham, Mich., assignor to Harry Ferguson, Inc., Detroit, Mich., a corporation of Delaware Application August 21, 1952, Serial No. 305,635

11 Claims. (Cl. 56—25)

The present invention pertains generally to mowing machines and more particularly to mowers in the form of attachments for tractors, although in some of its broader aspects, the invention is applicable to still other types of tractor-drawn implements or attachments.

Generally stated, it is an aim of the present invention to provide a mower attachment for tractors which is unusually rugged, effective, and reliable, yet relatively simple in construction, light in weight, and low in cost.

In one aspect, it is an object of the invention to provide an improved mechanism for adjusting the fore-and-aft tilt or pitch of the mower bar of a mower attachment for tractors. As applied to a mower attachment having a mower bar carried laterally of the tractor on a downwardly inclined drag bar, it is a further object to provide a mechanism for adjusting the tilt of the mower bar by rotating the drag bar about its inclined longitudinal axis while simultaneously swinging the drag bar in a fore-and-aft direction to maintain the mower bar generally perpendicular to the fore-and-aft axis of the tractor.

Another object is to provide a mower attachment or the like having a low cost drag bar arrangement affording relatively great ground clearance together with improved rigidity, strength, and adaptability.

In another aspect, it is an object of the invention to provide a mower attachment having a simplified yet relatively effective and reliable arrangement for raising the mower bar.

A further object is to provide a mower attachment in which the tilt adjustment of the mower bar, vertical shift between transport and working positions, and rearward break-out movement of the mower bar upon hitting an obstruction, are all correlated in an improved manner.

Further objects and advantages of the invention will become apparent in the course of the following description, taken in connection with the accompanying drawings, in which:

Fig. 11 is a diagrammatic plan view illustrating the action of the tilt adjusting mechanism.

Figure 1:
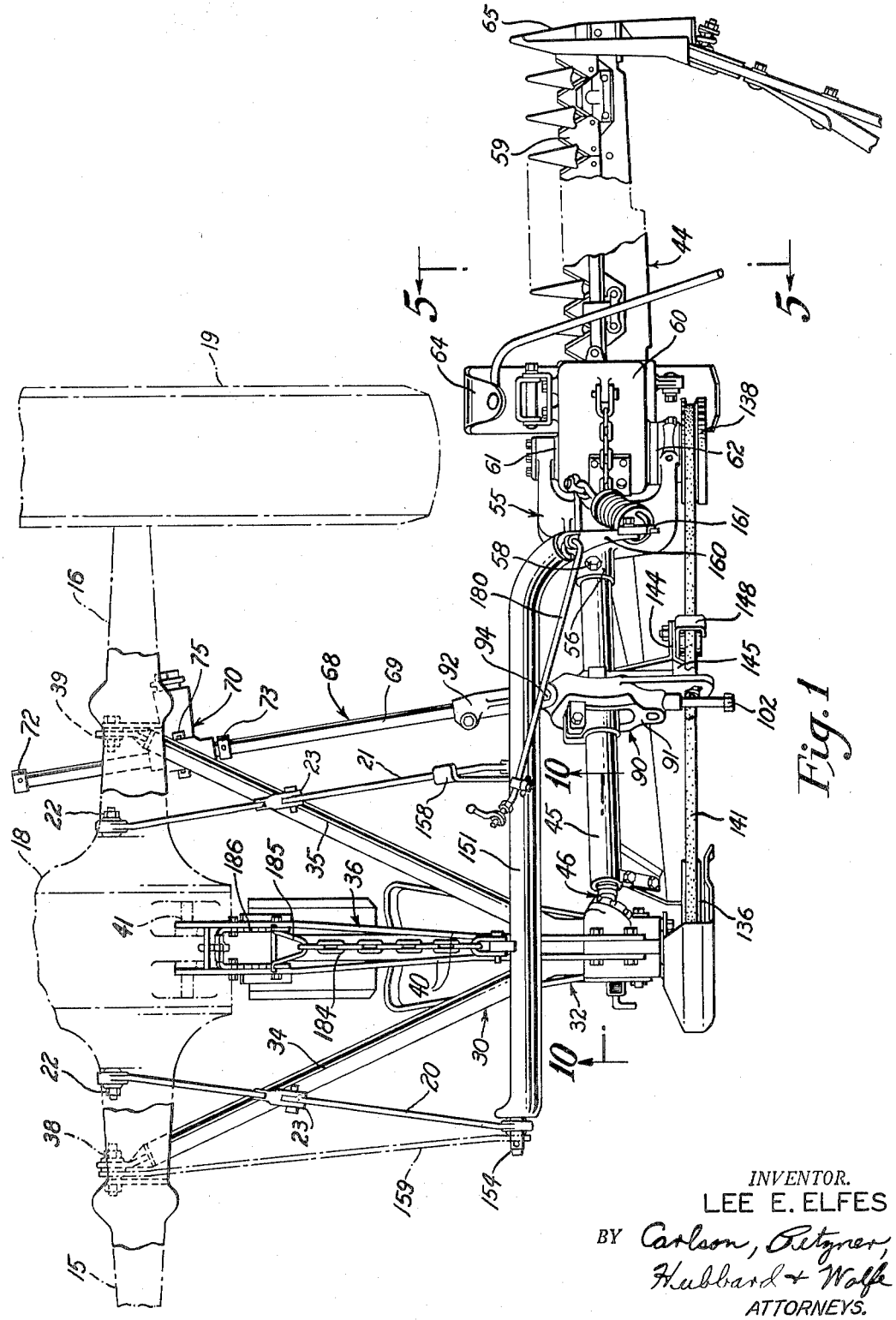
Figure 1 is a plan view of an illustrative mower attachment being shown as applied to a tractor the rear end portion of which is indicated in dot-dash outline.

While the invention is susceptible of various modifications and alternative constructions, there is shown in the drawings and will herein be described in detail a preferred embodiment, but it is to be understood that it is not thereby intended to limit the invention to the form disclosed, but it is intended to cover all modifications and alternative constructions falling within the spirit and scope of the invention as expressed in the appended claims.

Figure 2:
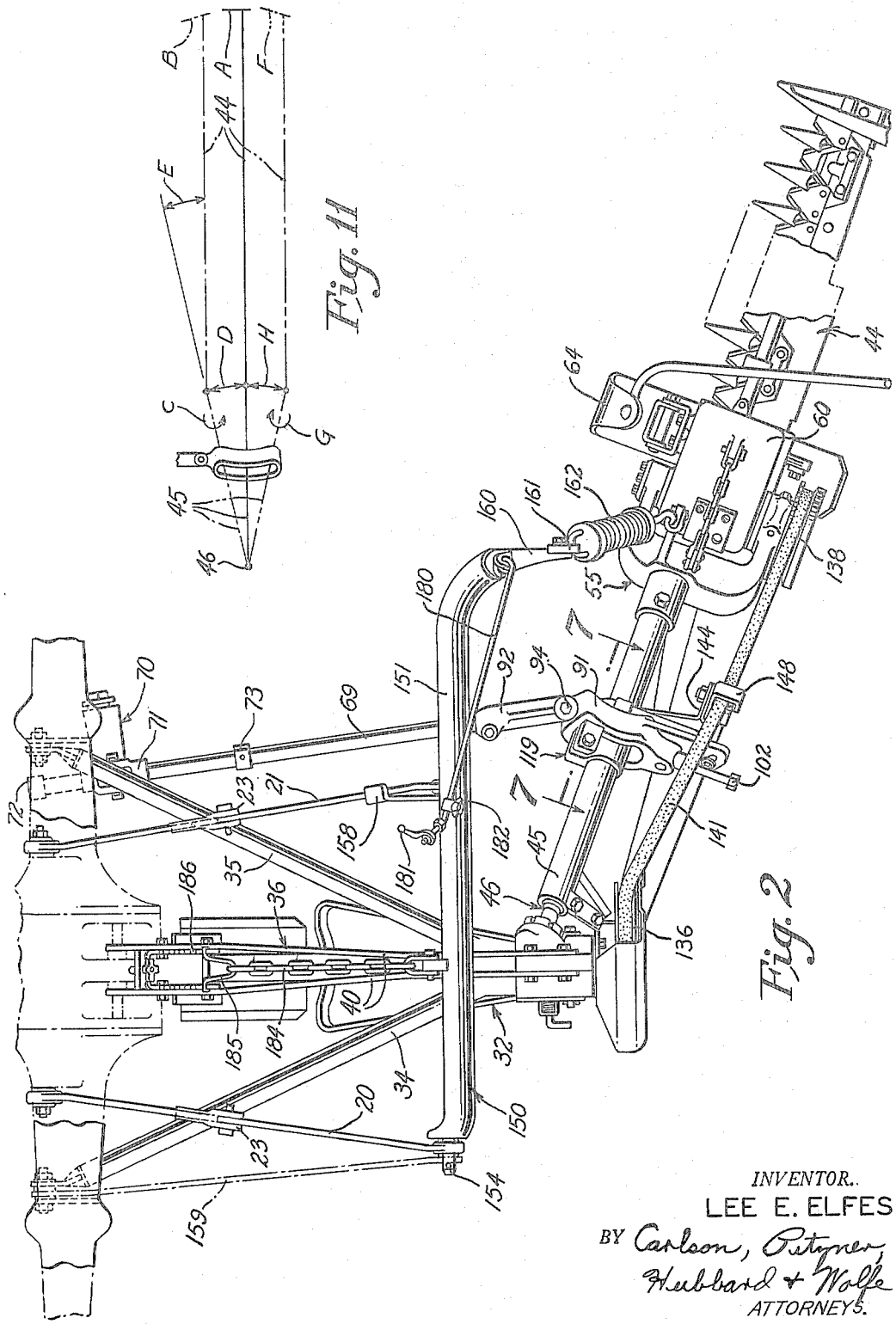
Fig. 2 is a plan view similar to Fig. 1 but showing the mower in its break-out position.

Referring more particularly to the drawings, the invention is illustrated therein as embodied in a particular mower attachment applied to a tractor, the rear end portion of which appears in dot-dash outline in Figs. 1 and 2. Although the drawings show the rear end portion of the well-known "Ferguson" tractor, this is simply illustrative of one of a variety of tractors to which the present implement can be applied.

Figure 5:
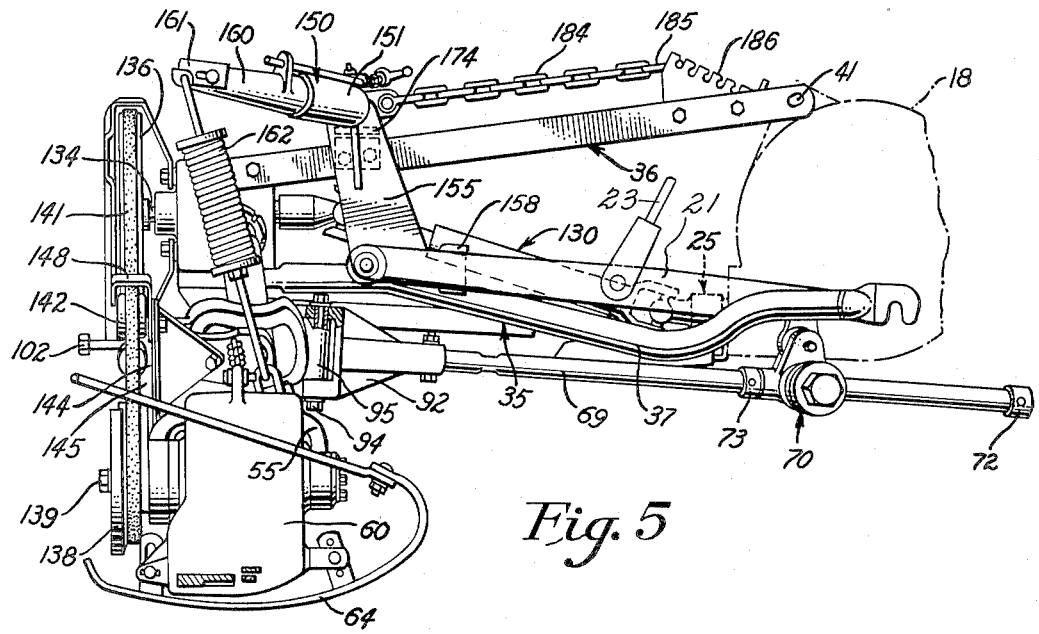
Fig. 5 is a side elevational view of the mower attachment, the mower bar being shown in section along the line 5—5 in Fig. 1.

As a preliminary to a description of the implement itself, the illustrated portions of the tractor may be briefly identified. As shown, the tractor has a pair of rear axle housings 15 and 16 extending outwardly from a differential housing 18. Pneumatic tired rear wheels 19 are situated at the outer ends of the axle housings. Trailing from the rear end portion of the tractor is a pair of laterally spaced draft links 20 and 21 connected to the differential housing by universal pivots 22 located below and slightly forward of the axis of the axle housings. To move the draft links in a vertical direction, respective drop links 23 are connected between intermediate points on the draft links and a power lift device, not shown, which may be of the type disclosed and claimed in Henry George Ferguson Patent No. 2,118,180, issued May 24, 1938. The tractor is also provided with a power take-off connection 25 (Fig. 5) mounted on the differential housing.

The mower attachment is detachably supported on the tractor by means of a mounting frame 30 (Fig. 1). As embodied in the illustrated mower attachment, the mounting frame constitutes a tripod structure having a bearing housing 32 at its rearwardly directed apex, together with a pair of forwardly diverging generally horizontal lower tripod legs 34 and 35, and an upwardly inclined tripod leg 36. The lower legs 34 and 35 are tubular in form and are provided with downwardly offset or bent intermediate portions 37 (Fig. 5) passing underneath the draft links 20 and 21 with adequate clearance. Pins 38 and 39 (Fig. 1) are provided to establish detachable connections between the front ends of the lower tripod legs and the rear axle housings at points spaced outwardly of the draft link pivots 22. The upper tripod leg 36 takes the form of a pair of generally parallel runners 40 bolted at their read ends to the bearing housing and detachably connected at their front ends to the differential housing by means of a pin 41.

Figure 10:
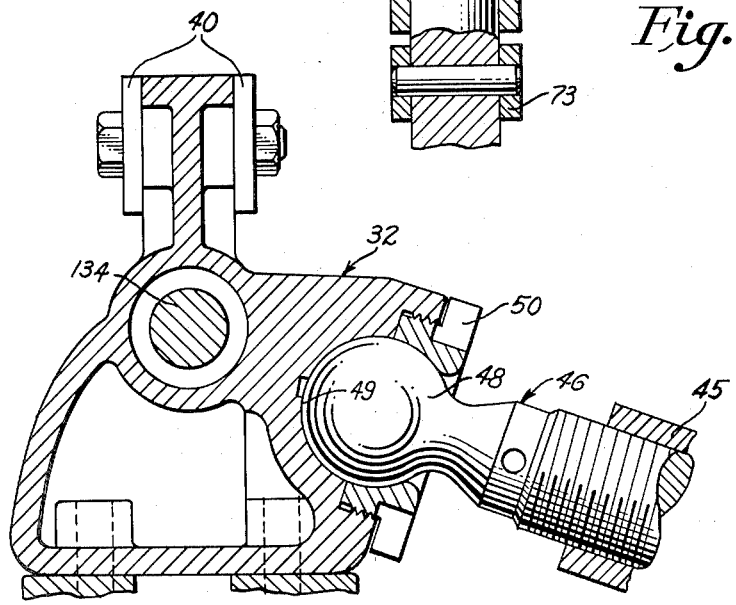
Fig. 10 is an enlarged fragmentary sectional view taken generally along the line 10—10 in Fig. 1 and showing a ball and socket connection playing a part in the tilt adjustment, the break-out action, and the lifting operation of the mower attachment.

The mower attachment is provided with a mower bar 44 which is carried laterally of the tractor on the outer end of a drag bar 45. The latter is connected to the bearing housing 32 for rotation about its longitudinal axis, as well as swinging movement in vertical and horizontal planes, by means of a ball and socket joint 46. In this instance, the joint includes a ball 48 (Fig. 10) mounted on the inner end of the drag bar, together with a socket 49 formed in the bearing housing. The ball is retained in the socket by means of an apertured check nut 50 threaded into the bearing housing.

In the illustrated mower, the drag bar 45 is advantageously formed at a straight, rigid tubular member. A yoke, in the form of a bifurcated casting 55 (Figs. 1 and 2), connects the mower bar to the drag bar for swinging movement in a vertical plane. The yoke receives the outer end of the drag bar in a closely fitting cylindrically recessed stem or projection 56, the drag bar being secured thereto by means of a transverse bolt 58. The mower bar includes a conventional cutting knife 59 adapted to be reciprocated by a driving head 60, rigidly secured to the inner end of the mower bar. Trunnions 61 and 62 on the driving head are journaled in the arms of the bifurcated casting 55 to provide pivotal support for the mower bar. Ground shoes 64 and 65 are mounted on the driving head 60 and the outer end of the mower bar 44, respectively.

Figure 8:
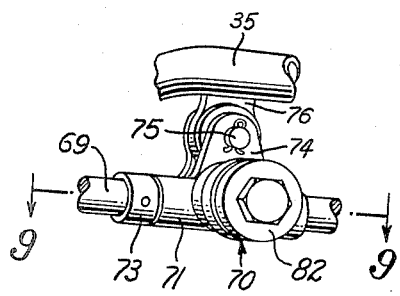
Fig. 8 is an enlarged fragmentary perspective view showing an overload release mechanism forming a part of a break-out mechanism employed in the mowing attachment.
Figure 9:
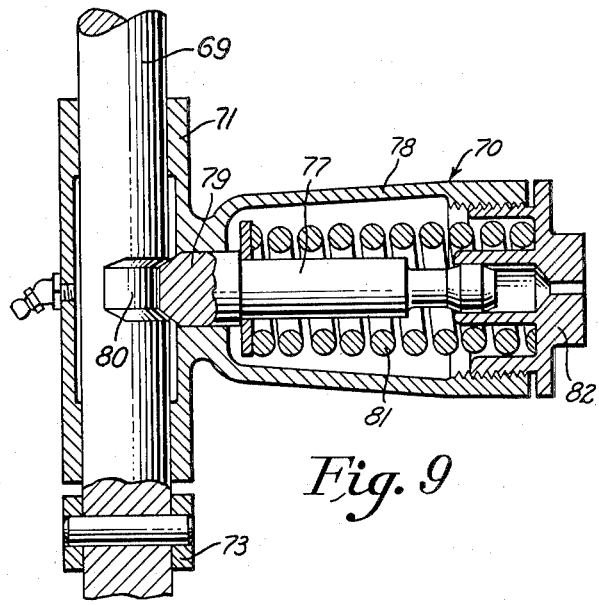
Fig. 9 is an enlarged fragmentary sectional view taken generally along the line 9—9 in Fig. 8 to show details of the overload release mechanism.

The mower bar 44 and the drag bar 45 are normally held in a laterally extending position by a releasable break-out mechanism 68 (Fig. 1), which provides for rearward swinging movement of the mower bar when an obstruction is encountered. In this instance, a break-out link 69, connected at its rear end to the drag bar 45, is releasably anchored to the mounting frame 30 by means of an overload release mechanism 70 (Figs. 1 and 8). The latter comprises a sleeve 71 in which the break-out link 69 is slidably received. The sliding movement of the link is limited by stops thereon in the form of collars 72 and 73. An ear 74, formed integrally with the sleeve, is apertured to receive a pivot pin 75 anchored to an apertured depending ear 76 (Fig. 8) on the tripod leg 35. The overload release mechanism 70 also includes a detent pin 77 (Fig. 9) slidable radially of the sleeve in a tubular housing 78 formed integrally therewith. On the pin 77 is a wedge-shaped head 79 engageable with a mating tapered groove 80 in the break-out link 69. During normal operation of the mower, the wedge head 79 is yieldably held in the groove by means of a compression spring 81 preloaded by an adjusting nut 82 to prevent sliding of the link 69 in the sleeve 71 under normal drag force on the mower bar. When an obstruction is encountered by the mower bar, however, the abnormally great tension on the link 69 causes the detent 79 to cam out of the tapered groove 80 and permits the link 69 to slide rearwardly in the sleeve 71 until the latter is accosted by the collar 72.

Provision is made for adjusting the fore-and aft tilt of the mower bar 44 relative to the ground. For this purpose, the mowing attachment includes a tilt adjusting mechanism 90 (Fig. 1) for rotating the drag bar 45 about its longitudinal axis. In itself, this axial rotation of the drag bar would not only change the tilt of the mower bar, but also would cause the outer end thereof to swing along the ground in a fore-and-aft direction relative to the inner end. The tendency would be for the outer end of the mower bar to swing forwardly relative to the inner end in response to rotation of the drag bar clockwise, as viewed from the outer end thereof, and vice versa. This swinging tendency is caused by the inclination of the drag bar relative to the mower bar. To compensate for this swinging tendency, the tilt adjusting mechanism is operative not only to rotate the drag bar axially, but also to swing the drag bar about its inner end in a fore-and-aft direction, so as to maintain the mower bar at right angles or at some other suitable, predetermined angle to the fore-and-aft axis of the tractor, despite the downward inclination of the drag bar.

For a better general understanding of the tilt adjusting arrangement, reference should be made to Fig. 11, wherein the drag bar 45, the mower bar 44 and the tilt adjusting mechanism are shown diagrammatically. In full lines, the mower bar 44 and the drag bar 45 are shown in their normal, laterally disposed position affording zero tilt of the mower bar. In other words, the mower bar is parallel to the ground as indicated diagrammatically at A.

Assuming now that it is desired to tilt the mower bar upwardly, or in other words, to elevate the leading edge thereof relative to the trailing edge thereof as indicated at B, the drag bar is rotated about its longitudinal axis in a counterclockwise direction as indicated by an arrow C. At the same time, the drag bar and the attached mower bar are swung forwardly about the inner end of the drag bar, through an angle D. The counterclockwise axial rotation of the drag bar accomplishes the desired upward tilting movement of the mower bar, but also has an undesirable effect, in that, used alone, it would cause the outer end of the mower bar to lag behind the inner end thereof, thereby positioning the mower bar out of the desired normal angular relation to the line of travel of the tractor and the mower. In other words, the axial rotation of the drag bar results in a rearward angular displacement of the mower bar through an angle E, relative to the vertical plane of the drag bar. However, this rearward angular displacement is neutralized by the simultaneous forward angular displacement of the drag bar through the angle D, which is made equal to E. The forward angular movement of the drag bar carries the inner end of the mower bar forward, but the outer end thereof is swung forward through a longer arc because of its greater distance from the pivot 46, so that the outer end overtakes the inner end. Thus the mower bar is maintained parallel to its original full line position, that is, normal to the line of travel of the mower.

When it is desired to tilt the leading edge of the mower bar downward, as at F, the reverse action takes place, that is, the drag bar 45 is rotated clockwise, as at G, and swung rearward through an angle H, thereby again maintaining the mower bar normal to the line of travel of the mower.

To effect the above described movements of the mower bar and drag bar, the mechanism 90 preferably comprises a plurality of guide elements including a guide member 91 connected to the rearward end of the break-out link 69 by means of a clevis 92 thereon. A generally vertical but slightly inclined pivot bolt 94 secures the clevis to a suitably apertured forwardly projecting ear 95 (Fig. 6) on the guide member. In this way, the guide member is restrained against fore-and-aft movement, as well as fore-and-aft tilting motion, with respect to the break-out link. As illustrated, the guide member is provided with a curved slot 96 through which the drag bar 45 extends. The slot has a curved, concave lower wall surface 97 and a curved, downwardly convex upper bearing surface or guideway 98. Mounted rigidly on the drag bar 45, as by welding or other suitable means, is a follower block or slider 99 provided with an upwardly concave curved surface 100 mating with the curved surface 98 on the guide member. When swung in a fore-and-aft direction along the slot 96, the drag bar 45 is constrained by the surfaces 98 and 100 and caused to rotate about its downwardly inclined longitudinal axis. The curvature of the surface 98, as illustrated, is such that the fore-and-aft swinging movement of the drag bar maintains the mower bar 44 substantially at right angles to the fore-and-aft axis of the tractor, as the drag bar is rotated to vary the tilt of the mower bar.

For the purpose of swinging the drag bar in a fore-and-aft direction to adjust the mower bar tilt angle, the tilt adjusting mechanism includes a screw 102 having its front end threaded transversely through a bar or shaft 104 journaled axially in the tubular drag bar 45. Clearance apertures 105a and 105b are provided for the screw in the drag bar 45 and slider 99, the apertures 105a and 105b being sufficiently large to accommodate eccentric movement of the screw 102 as the member 99 slides on the surface 98. To the rear of the drag bar, the screw 102 is rotatably journaled in a supporting pin 106 transverse thereto and is held against endwise movement relative to the pin by collars 108 and 109 fixed to the screw 102 and abutting against flat surfaces on opposite sides of the pin 106. The pin 106 is pivoted in the guide member 91 for rotation about an axis generally parallel to the longitudinal axis of the drag bar 45. Rearwardly of the guide member 91, the screw terminates in a wrench head 110.

Figure 6:
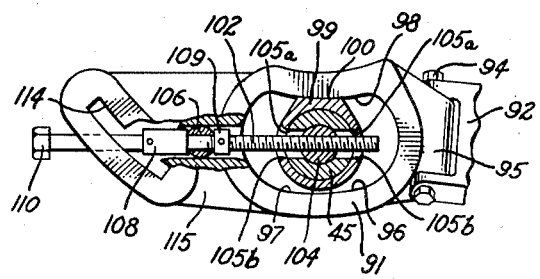
Fig. 6 is an enlarged fragmentary sectional view with parts broken away and shown in section taken generally along the line 6—6 in Fig. 4, and showing elements of a tilt adjusting mechanism.

The constraining action of the curved guide surfaces 98 and 100 is supplemented by further constraint tending to rotate the drag bar 45 as it is swung in a fore-and-aft direction. This supplementary constraint is preferably provided by a guide slot 114 formed in a rearwardly projecting arm 115 of the guide member 91. Engaging the slot is a follower element in the form of a clamping bolt 116, shown best in Figs. 3 and 4, which extends therethrough and also through an element rigidly mounted on the drag bar, such as a suitably apertured arm 118 on the slider 99, as illustrated. From its rear end, the guide slot 114 is inclined forwardly and downwardly so as to rotate the drag bar 45 in a counterclockwise direction (as seen in Fig. 6) as the slider 99 is moved forward along the slot 96. The curvature of the guide slot 114 is coordinated with the curvature of the slot 96 in such a manner that the tilt adjustment of the mower bar is made without causing its outer end either to lead or to lag its inner end. For adjustment, the clamping bolt 116 is loosened slightly, but for the normal mowing operation, the bolt is tightened to maintain the tilt adjustment.

Either the mating curved surfaces 98 and 100 or the guide slot 114 would be sufficient without the other to rotate the drag bar, but by providing both, a more positive action is assured.

Figure 7:
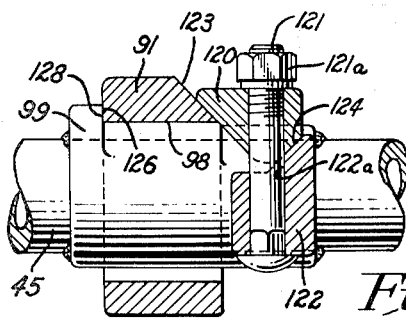
Fig. 7 is an enlarged fragmentary sectional view taken generally along the line 7—7 in Fig. 2, and showing a detail of the tilt adjusting mechanism.

The slider 99 and the curved guideway 98 are held in close contact by means of a clamping mechanism 119 (Figs. 2 and 3), which also restrains the guide member 91 against movement longitudinally of the drag bar 45. As best shown in Fig. 7, the clamping mechanism 119 includes a wedge clamping member 120, apertured to receive a clamping bolt 121 which is positioned in an aperture 122a in a forwardly extending lug 122 on the slider 99. Disposed for engagement by the wedge member are a pair of oppositely inclined surfaces 123 and 124, one on the guide member 91 and the other on the forwardly extending lug 122 of the slider 99. At the opposite end of the slider is a shoulder 126, disposed for engagement by a flat end face 128 on the guide member 91. When the bolt 121 is tightened, as by a nut 121a, the slider 99 is drawn up against the guideway 98, and at the same time, the guide member is clamped against the shoulder 126. During the tilt adjusting operation, the bolt 121 is loosened slightly to permit free movement of the slider along the guideway.

To obtain power from the tractor for reciprocating the cutter knife 59, the mower attachment includes a driving mechanism. As embodied in the illustrated implement, the driving mechanism includes a universally jointed, extensible drive shaft 130 (Fig. 5) forming a detachable driving connection to the power take-off device 25 on the tractor. A shaft 134, journaled in the bearing housing 32, is keyed or otherwise connected to the drive shaft 130 to rotate therewith. Mounted on the shaft 134, rearwardly of the ball and socket joint 46 associated with the drag bar, is a pulley 136 (see also Figs. 1 and 3). The driving head 60 on the mower bar 44 is equipped with a pulley 138 which is mounted on a shaft 139 journaled axially in the rearward trunnion 62 which supports the cutter head. The driving head itself may comprise a conventional crank or cam type mechanism, not shown, for converting the rotary motion of the shaft 139 into reciprocating motion. A V-belt 141 is looped around the pulleys 136 and 138 and is guided at intermediate points by means of a pair of idler pulleys 142 engaging its upper and lower flights respectively. Support for the pulleys 142 is provided by a mounting plate 144 having a slotted flange 145 adapted to be clamped to the guide member 91 by the clamping bolt 116, which may be loosened to permit adjustment of the pulleys 142. The mounting plate 144 has a pair of U-shaped extensions 148 for retaining the belt on the pulleys 142.

Provision is made for swinging the mower bar 44 and the drag bar 45 vertically on their respective pivots by operation of the power lift device on the tractor. For this purpose, the illustrated mower attachment is provided with a lift mechanism 150 (Fig. 3) including a laterally extending lift bar or member 151 having a downwardly projecting inner end portion 152 adapted to be detachably connected to the rear end of the left hand draft link 20, by means of a pivot pin 154. A depending bracket 155 is rigidly secured to the lift bar for detachable connection to the other draft link 21 by means of a pivot pin 156. Formed integrally with the bracket 155 is a forwardly extending laterally bifurcated arm 158 (Figs. 1 and 5) adapted to embrace the draft link 21 and thus restrain the lift bar against swinging movement on the pivots 154 and 156. To hold the lift bar against movement laterally of the tractor, a stabilizing bar 159 is connected between the pivots 38 and 154. At its outer end, the lift bar has a rearwardly projecting portion 160 provided with a latch 161 for connecting one end of an extension spring 162 thereto. At its opposite end, the spring is attached to an outwardly extending arm 164 of a bell crank 165 (Fig. 3), which is connected to the drag bar 45 by means of a generally horizontal pivot 166 mounted in an upwardly extending ear 168 on the bifurcated casting 55. An upwardly and outwardly inclined arm 169 on the bell crank is connected by means of a flexible line or chain 170 to an upwardly projecting ear 171 on the driving head 60. To prevent damage to the lift member 151 from shock and vibration, a cushion pad 174 is mounted on the upper tripod leg 36 for engagement by the lift member when the latter is in its lowered position.

Figure 3:
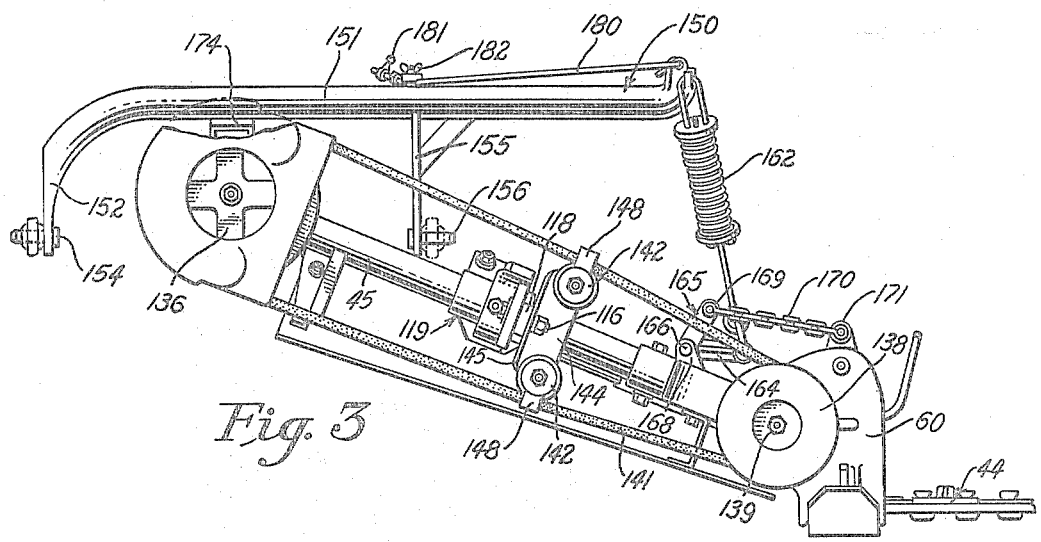
Fig. 3 is a rear elevational view of the mower attachment with the mower bar in its normal mowing position, a portion of the mower bar being broken away.

During normal operation of the mower bar 44, a portion of the combined weight of the mower bar, the driving head 60, and the drag bar 45, is supported by the spring 162 so that the ground shoes 64 and 65 ride easily over minor obstructions on the ground. In mowing over sloping ground, the spring 162 yields to permit the mower bar 44 to swing downwardly, while the chain 170 provides lost motion permitting the mower bar to swing upwardly. The mower bar may be swung upwardly to clear an obstruction by actuating the power lift device on the tractor so as to elevate the draft links 20 and 21 and the lift member 151. The resulting upward pull on the spring 162 rotates the bell crank 165 in a counterclockwise direction (as seen in Fig. 3) so as to tension the chain 170 and swing the mower bar 44 upwardly on the trunnions 61 and 62. As a further result of the upward pull exerted by the spring 162, the drag bar 45 swings upwardly about the ball and socket joint 46 and the break-out link pivot 75. During this movement, the break-out link 69 and the pivot bolt 94 effect axial rotation of the drag bar, which is permitted by the ball and socket joint.

Figure 4:
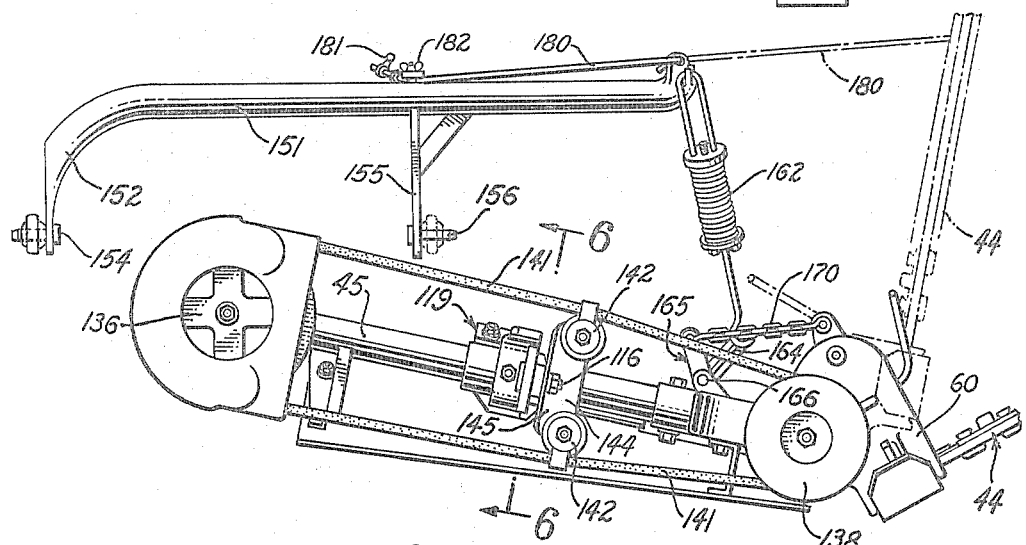
Fig. 4 is a rear elevational view similar to Fig. 3, the mower bar being shown fragmentarily in full lines in its elevated position, and in dot-dash outline in its transport position.

After raising the mower bar from the position of Fig. 3 to the full line position of Fig. 4, by operating the power lift device on the tractor, the operator may swing the mower bar upwardly by hand to a substantially vertical transport position, as shown in dotted lines in Fig. 4. The mower bar may be locked in this position by means of a brace rod 180, pivotally attached at one end to the lift member 151 and adapted at its opposite end to be secured to the mower bar, by means of a lock nut 181 or the like. When the mower bar is again lowered, the brace rod 180 is returned to its full line position shown in Fig. 4, and held therein by a wing nut clip 182.

To hold the lift member 151 in an elevated position, the mower attachment is provided with a chain 184 (Fig. 5), secured at one end to the lift member and equipped at its opposite end with a hooked terminal member 185, which is adapted to be attached to a notched rack 186 mounted on the upper tripod leg 36. The hooked member 185 may be engaged with any of the several teeth on the rack, according to the vertical position of the lift member 151. The chain 184 exerts a forward pull on the member 151 tending to rock the same about the pins 154, 156 and urging the arm 158 against the draft link 21.

While the operation of the implement is no doubt apparent from the foregoing description, it will be helpful to present a brief summary at this point. It may be assumed initially that the mower bar 44 is in its lowered, operative position shown in Fig. 3, and that the break-out mechanism is in the normal condition shown in Fig. 1, with the break-out link 69 holding the drag bar 45 in a laterally extending position. As the tractor is driven forward, the mowing operation is carried on in the normal manner. The knife 59 is reciprocated by power obtained from the power take-off device 25 on the tractor and transmitted between the pulleys 136 and 138 by the belt 141.

When it is desired to change the tilt of the mower bar 44, the tractor is brought to a halt and the power take-off device is stopped. To permit adjustment of the slider 99 along the curved slot 96 in the guide member 91, the clamping bolts 116 and 121 are loosened somewhat. The adjusting screw 102 is then rotated by means of a suitable wrench so as to shift the drag bar 45 in a generally fore-and-aft direction. The action of the guide slot 114 on the clamping bolt 116, together with the interaction of the mating curved surfaces 98 and 100, rotates the drag bar 45 about its longitudinal axis as the latter is swung in a fore-and-aft direction. Such rotation is provided for by the ball and socket joint 46. To tilt the mower bar upward at the front, the drag bar is swung forwardly and rotated counterclockwise axially by adjustment of the screw 110. The axial rotation tends to cause the outer end of the mower bar to swing rearwardly, but this tendency is compensated for by the forward swinging movement of the drag bar. Conversely, the mower bar may be tilted downwardly at its front edge, while maintaining its normal angular relationship to its line of travel, by swinging the drag bar rearwardly along the slot 96.

After the tilt adjustment has been accomplished, the idler pulleys are positioned so as to produce a minimum deflection of the belt, whereupon the clamping bolt 116 and the clamping screw 121 are tightened down.

Since the entire drag bar is rotated to change the tilt of the mower bar, the drag bar itself may be a simple, straight, rigid member of extremely low-cost construction. As compared with conventional bent, swivel jointed drag bars, the drag bar 45 provides a stronger, more rigid support for the heavy driving head 60, and a more convenient support for the idler pulleys 142. Moreover, the straight drag bar provides greater ground clearance, resulting in less fouling of the mower with grass and less chance of damage from obstructions.

Upon resumption of the mowing operation, an obstacle may be encountered offering sufficient resistance to unlatch the break-out link 69 from the release mechanism 70 by camming the detent pin 77 out of the groove 80 in the break-out link. As the tractor moves forwardly before it can be brought to a halt, the mower bar 44 and the drag bar 45 swing rearwardly on the ball and socket pivot 46 as shown in Fig. 2. The rearward break-out movement is limited by the collar 72 on the break-out link 69, but ample time is provided for stopping the tractor before damage can occur to the mowing attachment. Because of the rearwardly and laterally eccentric position of the pulley 136 with respect to the ball and socket joint 46, the drive belt 141 is loosened by the rearward swing of the drag bar, and the operation of the cutter bar 44 is thereby discontinued, independently of the continued operation of the power take-off device on the tractor.

After coming to a halt, the operator backs up the tractor to retreat from the obstruction. Because of ground friction on the mower bar, the latter swings forwardly on the ball and socket pivot 46 so as to relatch the overload release mechanism 70. To clear the obstruction, the mower bar is swung upwardly by elevating the draft links 20 and 21. The pull thus exerted on the spring 162 rotates the bell crank 165 so as to effect upward swinging movement of the mower bar 44 on its pivots. At the same time, the drag bar 45 is swung up bodily. For transport, the mower bar is elevated manually into the dotted line position shown in Fig. 4 and secured in this position by the brace rod 180.

To disconnect the implement from the tractor, it is necessary merely to detach the lift bar 151 and the tripod mounting frame 30. This may be accomplished by removing the pins 38, 39, 41, 154 and 156. Upon disconnection of the drive shaft 130 from the power take-off unit, the tractor may be driven away for another use. Hitching of the implement to the tractor may, of course, be accomplished with speed and facility by reversal of the foregoing procedure.

I claim as my invention:

1. In a mower attachment for a tractor having a pair of laterally spaced draft links trailingly pivoted thereon for vertical movement by a power lift device on the tractor, the combination comprising a mounting frame, means for detachably connecting the mounting frame to the tractor in a fixed position thereon, a laterally extending drag bar pivoted to the frame for vertical and fore-and-aft swinging movement, a laterally extending mower bar pivoted to the outer end of the drag bar for swinging movement in a vertical plane, and means connected to the mower bar and the drag bar and adapted to be detachably connected to at least one of the draft links for swinging the drag bar and the mower bar upwardly by operation of the power lift device, said means being yieldable when said drag bar swings in a fore-and-aft movement.

2. In a mower attachment for a tractor having a pair of laterally spaced draft links trailingly pivoted thereon for vertical movement by a power lift device on the tractor, the combination comprising a mounting frame, means for detachably connecting the mounting frame to the tractor in a fixed position thereon, a laterally extending drag bar pivoted to the frame for vertical swinging movement, a laterally extending mower bar pivoted to the outer end of the drag bar for swinging movement in a vertical plane, a laterally extending lift bar, means for detachably connecting the lift bar to the draft links, an extension spring having one end connected to the lift bar, means connecting the other end of the spring to the drag bar and the mower bar to sustain a portion of the combined weight of the drag bar and the mower bar during normal operation of the mower bar and to lift the drag bar and the mower bar by operation of the power lift device.

3. A mower attachment for use with a tractor or the like comprising in combination, a mounting frame adapted to be fixed to the tractor in rearwardly extending relation with respect thereto, a drag bar swingably and rotatably connected at one end to said frame and extending laterally and downwardly therefrom, a laterally extending mower bar pivotally connected to the free end of said drag bar for swinging movement in a vertical plane, and means on said frame cooperating with means on said drag bar for constraining the drag bar to rotate axially and to swing in a fore-and-aft direction conjointly relative to said frame.

4. In a mower attachment for use with a tractor or the like comprising in combination a mounting frame adapted to be fixed to the tractor in rearwardly extending relation with respect thereto, a drag bar swingably and rotatably connected at one end to said frame and extending laterally and downwardly therefrom, a laterally extending mower bar pivotally connected to the free end of said drag bar for swinging movement in a generally vertical plane, means on said frame for effecting fore-and-aft swinging movement of the drag bar relative to said frame, and means operable by said fore-and-aft swinging means for simultaneously rotating the drag bar about its longitudinal axis to adjust the tilt of the mower bar, the fore-and-aft movement being effective to compensate for the inclination of the drag bar.

5. In a mower attachment for use with a tractor or the like comprising in combination, a mounting frame adapted to be fixed to the tractor in rearwardly extending relation with respect thereto, a drag bar swingably and rotatably connected at one end to said frame and extending laterally and downwardly therefrom, a laterally extending mower bar pivotally connected to the free end of said drag bar for swinging movement in a generally vertical plane, a generally fore-and-aft break-out link on said frame for releasably holding the drag bar against rearward swinging movement, means forming a part of said break-out link for effecting fore-and-aft swinging movement of the drag bar relative to said break-out link and means operable by said fore-and-aft swinging means for simultaneously rotating the drag bar about its longitudinal axis to adjust the tilt of the mower bar, and fore-and-aft movement being effective to compensate for the inclination of the drag bar relative to the mower bar.

6. A mower attachment for use with a tractor or the like comprising in combination, a mounting frame adapted to be fixed to the tractor in rearwardly extending relation with respect thereto, a drag bar swingably and rotatably connected at one end to said frame and extending laterally and downwardly therefrom, a laterally extending mower bar pivotally connected to the free end of said drag bar for swinging movement in a vertical plane, a drag bar guide member releasably mounted on said frame and extending rearwardly and generally parallel thereto, means cooperating with said drag bar and said guide member for swinging the drag bar in a fore-and-aft direction relative to the guide member, said guide member and said drag bar having mating curved surfaces thereon for constraining the drag bar to rotate about its longitudinal axis in response to the fore-and-aft swinging movement thereof in order to adjust the tilt of the mower bar while compensating for the inclination of the drag bar.

7. A mower attachment for use with a tractor or the like comprising in combination, a mounting frame adapted to be fixed to the tractor in rearwardly extending relation with respect thereto, a break-out mechanism mounted on the forward end of the frame and including a releasable link extending generally rearwardly and parallel to said frame, said link having a generally horizontal arcuate slot in the rear end thereof, a drag bar swingably and rotatably connected at one end to the rear portion of said frame and extending laterally and downwardly therefrom and through said slot, a laterally extending mower bar pivotally connected to the free end of said drag bar for swinging movement in a generally vertical plane, and inter-engaging guide elements on said drag bar and said link, including an inclined guide surface on one and a follower on the other for rotating the drag bar relative to the link in response to fore-and-aft movement of the drag bar along the slot.

8. A mower attachment for use with a tractor or the like comprising in combination a mounting frame adapted to be fixed at its forward end to the tractor in rearwardly extending relation with respect thereto, a guide member releasably mounted on said frame near the forward end thereof and extending generally and rearwardly parallel thereto, said guide member having a generally horizontally curved slot therein including a convex upper wall surface and a concave lower wall surface, a drag bar swingably and rotatably connected at one end to said frame and extending laterally and downwardly therefrom through said slot, a member on said drag bar having a curved surface mating with one of said surfaces of said slot, a laterally extending mower bar pivotally connected to the free end of said drag bar for swinging movement in a vertical plane, and an adjusting screw on said guide member for swinging the drag bar along said slot, said guide member having therein a second arcuate slot extending generally upwardly and rearwardly, and a follower element fixed on said drag bar and cooperating with said second slot for rotating the drag bar in response to fore-and-aft movement thereof in said first mentioned slot, said fore-and-aft movement of the drag bar being effective to compensate for the inclination of the drag bar when the drag bar is rotated to change the tilt of the mower bar, and means on said guide member for releasably maintaining the adjusted drag bar in the desired position.

9. In a mower attachment for use with a tractor or the like including a power take-off device, the combination comprising, a mounting frame adapted to be detachably fixed to the tractor in rearwardly extending relationship with respect thereto, a drag bar swingably and rotatably mounted at one end on said frame and extending laterally and downwardly therefrom, a laterally extending mower bar pivotally connected to the free end of said drag bar for swinging movement in a vertical plane, means connected to said frame and cooperating with said drag bar for adjusting the lateral tilt of the mower bar relative to the frame, said adjusting means including a clamping bolt for releasably maintaining the tilt adjustment of the mower bar, a pulley on the mower bar for operating the same, means including a belt for drivingly connecting the pulley to the power take-off device, a pair of idler pulleys for engaging and guiding the belt, and means for releasably mounting said idler pulleys on said adjusting means for adjusting the position of the idler pulley when the tilt of the mower bar is changed.

10. A mower attachment for a tractor having a pair of laterally spaced draft links trailingly pivoted thereon for vertical movement by a power lift device on the tractor, comprising, in combination, a mounting frame, means for detachably connecting the mounting frame to the tractor in a fixed position thereon, a laterally extending drag bar pivoted at one end to the frame for vertical and fore-and-aft swinging movement, a laterally extending mower bar pivoted to the outer end of the drag bar for swinging movement in a vertical plane, and a laterally extending lift bar adapted to be detachably secured to the draft links, characterized by the inclusion of means including tension transmitting elements connecting the lift bar and the mower bar to the drag bar for swinging the drag bar and the mower bar upwardly by operation of the power lift device, said tension transmitting elements being yieldable when said drag bar swings in a fore-and-aft movement.

11. A mower attachment for use with a tractor or the like having a pair of laterally spaced draft links trailingly pivoted thereon for vertical movement by a power lift device on the tractor, comprising in combination, a mounting frame adapted to be fixed to the tractor in rearwardly extending relation with respect thereto, a break-out member releasably fixed to the forward end of the frame and extending generally rearwardly and parallel thereto, means for restraining said break-out member against fore-and-aft movements relative to said frame, said break-out member having a generally horizontal arcuate slot in the rear end thereof, a drag bar swingably and rotatably connected at one end to the rear portion of said frame and extending laterally and downwardly therefrom and through said slot, a laterally extending mower bar pivotally connected to the free end of said drag bar for swinging movement in a generally vertical plane, inter-engaging guide elements on said drag bar and said break-out member, including an inclined guide surface on one and a follower on the other for rotating the drag bar relative to the break-out member in response to fore-and-aft movement of the drag bar along the slot, and means connecting the draft links to the mower bar and the draft bar for swinging them upwardly relative to the frame upon operation of the power lift device.

References Cited in the file of this patent

UNITED STATES PATENTS

| | | |
|---|---|---|
| 1,225,531 | Twombly | May 8, 1917 |
| 2,105,125 | Meinholdt | Jan. 11, 1938 |
| 2,245,451 | Simpson | June 10, 1941 |
| 2,299,841 | Moyer | Oct. 27, 1942 |
| 2,387,070 | Hilblom | Oct. 16, 1945 |
| 2,413,873 | Hume | Jan. 7, 1947 |
| 2,533,804 | Hitchcock | Dec. 12, 1950 |
| 2,550,412 | Girardi | Apr. 24, 1951 |
| 2,580,265 | Abgarian | Dec. 25, 1951 |